United States Patent
Mack-Crane

(10) Patent No.: US 9,674,315 B2
(45) Date of Patent: Jun. 6, 2017

(54) METHODS FOR DYNAMICALLY BINDING HEADER FIELD IDENTIFIERS IN A NETWORK CONTROL PROTOCOL

(71) Applicant: Futurewei Technologies, Inc., Plano, TX (US)

(72) Inventor: Thomas Benjamin Mack-Crane, Downers Grove, IL (US)

(73) Assignee: Futurewei Technologies, Inc., Plano, TX (US)

(*) Notice: Subject to any disclaimer, the term of this patent is extended or adjusted under 35 U.S.C. 154(b) by 105 days.

(21) Appl. No.: 14/269,704

(22) Filed: May 5, 2014

(65) Prior Publication Data

US 2014/0334492 A1 Nov. 13, 2014

Related U.S. Application Data

(60) Provisional application No. 61/820,331, filed on May 7, 2013.

(51) Int. Cl.
    *H04L 29/06* (2006.01)
    *H04L 12/24* (2006.01)

(52) U.S. Cl.
    CPC .......... *H04L 69/22* (2013.01); *H04L 41/0803* (2013.01)

(58) Field of Classification Search
    CPC ....... H04L 45/38; H04L 45/745; H04L 29/06; H04L 12/741; H04L 45/64; H04L 47/2483; H04L 45/52; H04L 45/70; H04L 69/22
    See application file for complete search history.

(56) References Cited

U.S. PATENT DOCUMENTS

| 7,948,991 B1* | 5/2011 | Hart ...................... H04L 1/1854 370/395.4 |
| 2003/0179713 A1 | 9/2003 | Fleming |
| 2011/0289230 A1 | 11/2011 | Ueno |

(Continued)

FOREIGN PATENT DOCUMENTS

| CN | 1650584 A | 8/2005 |
| CN | 102308534 A | 1/2012 |

(Continued)

OTHER PUBLICATIONS

"OpenFlow Switch Specification," Open Networking Foundation, Version 1.3.3 (Protocol version 0x04), Sep. 27, 2013, 164 pages.

(Continued)

*Primary Examiner* — Anez Ebrahim
(74) *Attorney, Agent, or Firm* — Slater Matsil, LLP

(57) ABSTRACT

Header field identifiers can be dynamically bound to header fields in software defined networks via signaling between software defined network (SDN) controllers and switches. Dynamically establishing header binding definitions may allow new header fields to be recognized and manipulated (e.g., matched, modified, etc.) by SDN switches without having to update the corresponding standard. To achieve this, an SDN controller sends a binding request to an SDN switch to propose that a header field identifier be dynamically associated with a header field type. If the SDN switch acknowledges the binding request, then the header field identifier is used to identify the header field type in messages (e.g., control messages, etc.) transmitted to the SDN switch.

19 Claims, 6 Drawing Sheets

(56) References Cited

U.S. PATENT DOCUMENTS

| | | | | |
|---|---|---|---|---|
| 2012/0300615 | A1* | 11/2012 | Kempf | H04W 24/02 370/216 |
| 2013/0188514 | A1* | 7/2013 | Jain | H04L 61/103 370/254 |
| 2015/0146718 | A1* | 5/2015 | Wang | H04L 45/38 370/389 |

FOREIGN PATENT DOCUMENTS

| | | |
|---|---|---|
| CN | 102882808 A | 1/2013 |
| EP | 1220508 A1 | 7/2002 |

OTHER PUBLICATIONS

International Search Report received in Application No. PCT/CN2014/076951, mailed Jul. 23, 2014, 11 pages.

Denicol, R., et al., "On IPv6 Support in OpenFlow Via Flexible Match Structures," Poster Session of Change & Ofelia Summer School, Nov. 8, 2012, 2 pages.

Lu, G., et al., "ServerSwitch: A Programmable and High Performance Platform for Data Center Networks", USENIX, Mar. 7, 2011, pp. 1-14.

Yadav, N., et al., "OpenFlow Primitive Set"—Google Inc., External Version: 0.1, Created Jul. 2011, 40 pages.

\* cited by examiner

METHODS FOR DYNAMICALLY BINDING HEADER FIELD IDENTIFIERS IN A NETWORK CONTROL PROTOCOL

This patent application claims priority to U.S. Provisional Application No. 61/820,331, filed on May 7, 2013 and entitled "Methods for Dynamically Binding Header Field Identifiers in a Network Control Protocol," which is hereby incorporated by reference herein as if reproduced in its entirety.

TECHNICAL FIELD

The present invention relates generally to packet-based communications, and, in particular embodiments, to methods for dynamically binding header field identifiers in a network control protocol.

BACKGROUND

Protocols like OpenFlow that control network traffic forwarding behavior often refer to specific information (header fields, timeslots, etc.) to recognize information flows that may be subject to specified forwarding treatment. In OpenFlow, for example, the flow_mod message identifies the information to be matched in a packet by using identifier values assigned to specific pre-defined header fields. These identifier values are bound (e.g., defined to represent) header fields when the protocol is specified. This approach is inflexible in that it requires a modification of the protocol specification to introduce support for new header fields or existing header fields that have not been previously assigned an identifier value. This impedes innovation, and therefore more flexible techniques for supporting new header fields are desired.

SUMMARY OF THE INVENTION

Technical advantages are generally achieved, by embodiments of this disclosure which describe methods for dynamically binding header field identifiers in a network control protocol.

In accordance with an embodiment, a method for dynamically binding header field identifiers is provided. In this example, the method includes sending a binding request to an SDN switch of an SDN domain. The binding request requests establishment of a dynamic header definition that dynamically associates a header field with a first header field identifier. The method further includes determining whether the SDN switch acknowledges establishment of the dynamic header definition. The first header field identifier is configured to identify the header field in messages communicated to the SDN switch when the SDN switch acknowledges establishment of the dynamic header definition. An apparatus for performing this method is also provided.

In accordance with another embodiment, another method for dynamically binding header field identifiers. In this example, the method comprises receiving a binding request from an SDN controller. The binding request requests establishment of a dynamic header definition that dynamically associates a header field with a first header field identifier. The method further includes sending a binding response to the SDN controller that either acknowledges or declines establishment of the dynamic header definition, and using the first header field identifier to identify the header field in messages received by the SDN switch when the binding response acknowledges establishment of the dynamic header definition. An apparatus for performing this method is also provided.

BRIEF DESCRIPTION OF THE DRAWINGS

For a more complete understanding of the present invention, and the advantages thereof, reference is now made to the following descriptions taken in conjunction with the accompanying drawing, in which:

FIG. 1 illustrates a diagram of an embodiment SDN architecture;

FIG. 2 illustrates a protocol diagram of an embodiment communications sequence for dynamically binding header field identifiers to header field types;

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 3:
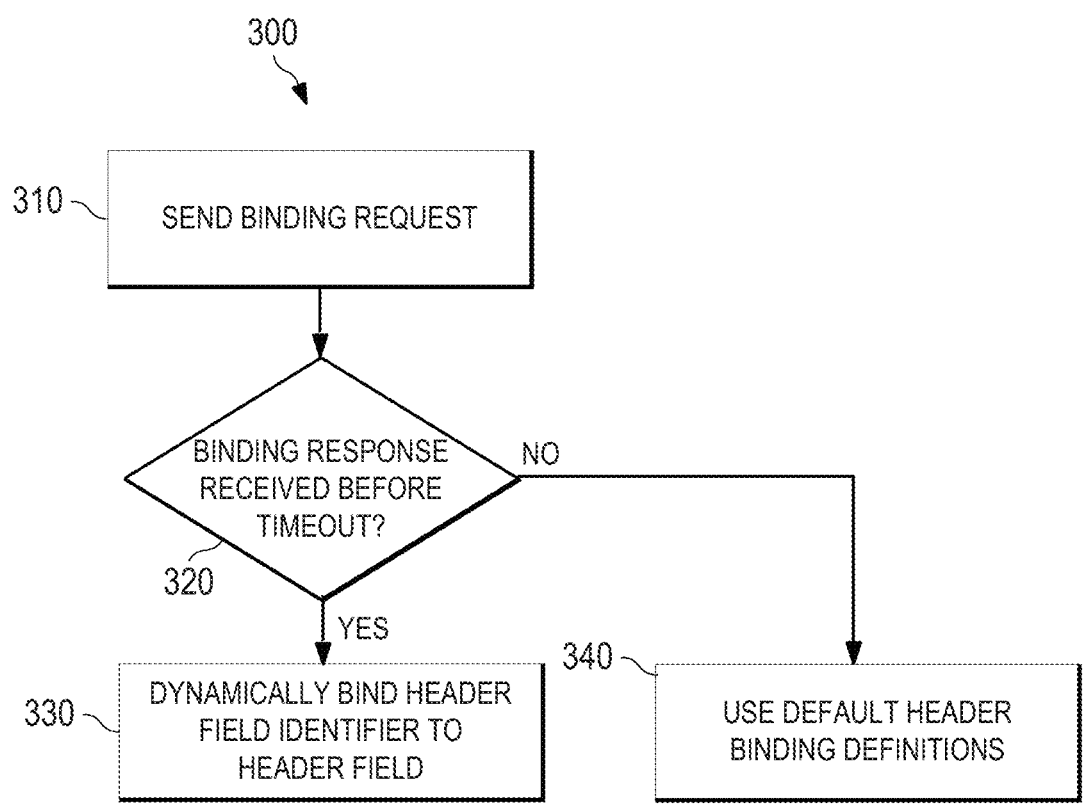
FIG. 3 illustrates a flowchart of an embodiment method for dynamically binding header field identifiers to header field types.

The making and using of the embodiments of this disclosure are discussed in detail below. It should be appreciated, however, that the presently disclosed embodiments provide many applicable inventive concepts that can be embodied in a wide variety of specific contexts. The specific embodiments discussed are merely illustrative of specific ways to make and use the invention, and do not limit the scope of the invention.

Aspects of this disclosure provide a method for dynamically binding header field identifiers in SDN architectures so that header fields can be recognized and manipulated (e.g., matched, modified, etc.) by SDN switches. In an embodiment, an SDN controller sends a binding request to an SDN switch to propose that a header field identifier be dynamically associated with a header field type. If the SDN switch acknowledges the binding request, then the header field identifier is used to identify the header field type in messages (e.g., control messages, etc.) transmitted to the SDN switch. For example, in OpenFlow networks, the binding request may include a code point binding indication that requests a corresponding header field be dynamically associated with a first OpenFlow extensible match (OXM) field of a first OXM class. If the code point binding indication is acknowledged by the SDN switch, then the header field will be identified in messages carrying the first OXM field and the first OXM class in an OXM type-length-value (TLV). In some embodiments, the SDN switch and SDN controller may negotiate a different header field binding association.

For example, the SDN switch may return a binding response that proposes (or indicates) that a different header field identifier is associated with the header field type. To support backwards compatibly for legacy SDN switches (e.g., switches that do not recognize dynamic binding requests), the SDN controller may determine that an SDN switch is configured to understand a set of default header binding associations when the SDN switch does not return a binding response within a timeout period. The set of default bindings may be defined by a communication standard publication. For example, in OpenFlow networks, the set of default bindings may correspond to those listed in section 7.2.3.7 of the OpenFlow Switch Specification (version 1.3.3, Protocol version 0x04), which is incorporated by reference herein as if reproduced in its entirety. These and other aspects of this disclosure are explained in greater detail below.

Figures 1, 2:
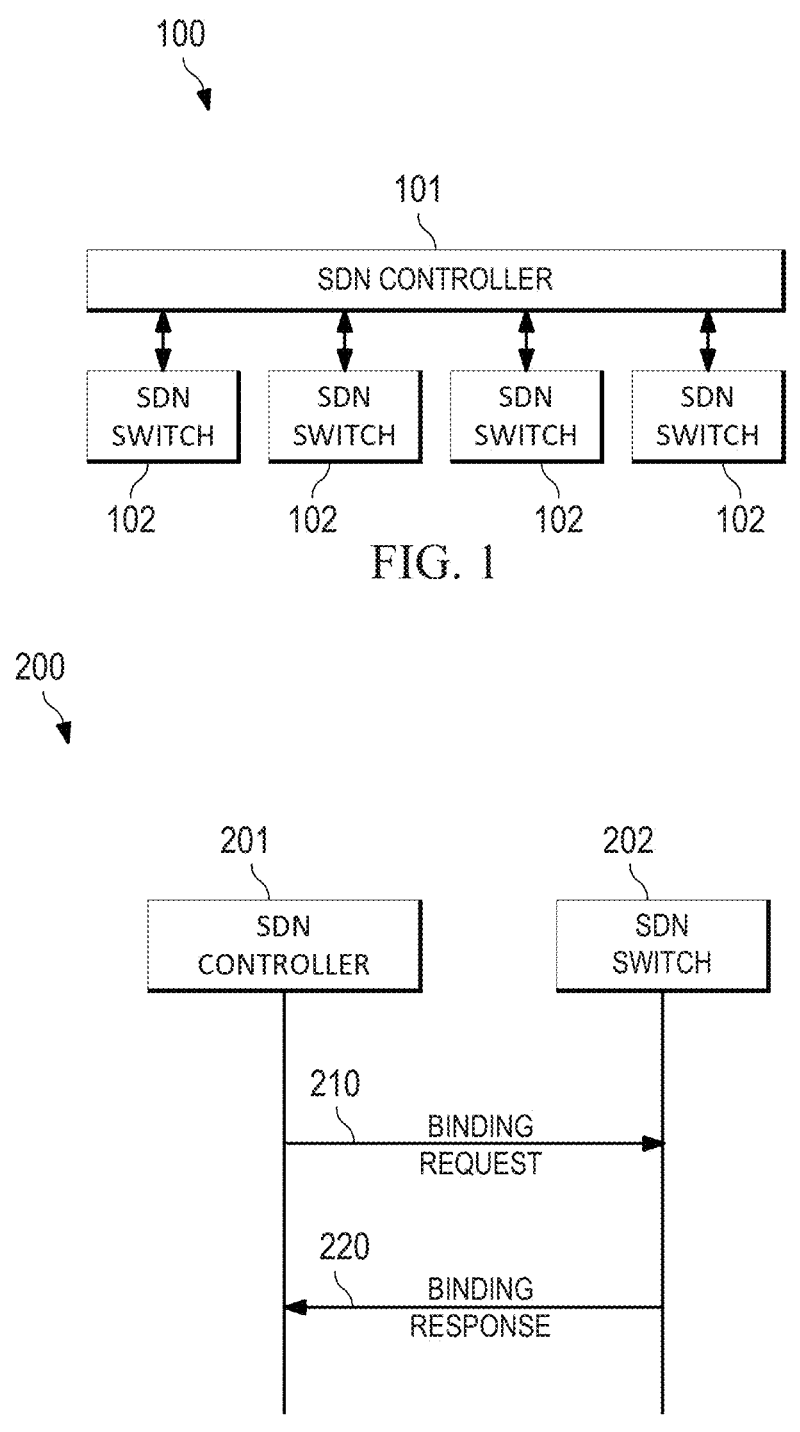

FIG. 1 illustrates an embodiment SDN architecture 100 configured to support the dynamic binding of header field identifiers to header field types. As shown, the SDN architecture 100 includes an SDN controller 101 and SDN switches 102. As used herein, the term "SDN switch" refers to any data plane entity in a software defined network that is configured to perform data plane processing tasks, e.g., packet forwarding, filtering, computing, compression processing, etc. For example, the SDN switches 102 may be any entity (hardware, virtual machines instantiated on host devices, etc.) configured to perform data-plane processing in the embodiment SDN architecture 100. In this disclosure, the term "SDN controller" refers to any device (or collection of devices) configured to control (e.g., direct, configure, etc.) data-plane processing operations of SDN switches. Hence, the SDN controller 101 may be any entity configured to drive the data-plane processing of the SDN switches 102.

Aspects of this disclosure provide techniques for dynamically binding header field identifiers using binding requests/responses. FIG. 2 illustrates a protocol diagram of an embodiment communications sequence 200 for dynamically binding header field identifiers to header field types. As shown, an SDN controller 201 sends a binding request message 210 to an SDN switch 202. The binding request message 210 may request that a header field be dynamically associated with a header field identifier during runtime operation of the SDN switch. In some embodiments, a single binding request message may request multiple dynamic header field bindings. The SDN switch 202 may return a binding response message 220 to the SDN controller 201 upon receiving the binding request message 210. The binding response message 220 may acknowledge the dynamic binding association requested by the binding request message 210. In such cases, the SDN controller 201 may write an appropriate entry to a data table to reflect that the header field identifier will be used to identify the header field during data plane processing at the SDN switch 202. Alternatively, the binding response message 220 may request (or otherwise indicate) that the header field be dynamically associated with a different header field identifier. In such cases, the SDN controller 201 may acknowledge the alternative binding, or propose yet another binding. In some embodiments, an alternative binding indication carried in the binding response 220 may be accepted by the SDN controller 201 without an affirmative acknowledgment being communicated to the SDN switch 202.

In some embodiments, header fields are defined by a header type, an offset, and a length. The offset may be a number of bits positioned between the header field and the beginning of the header. The length may be a number of bits included in the header field. Header types may be known to both SDN controllers and switches by either a common name (e.g., a character string like "Ethernet" or "IPv4") or a specified header field value (e.g., EtherType value, IP header Protocol field value, etc.). In some embodiments, header field definitions are a priori information to both the SDN controller and the SDN switch. In other embodiments, the SDN controller sends header field definitions to SDN switches as part of a header field identifier binding protocol. In some embodiments, the binding request/response messages are used to create new header binding definitions and/or to modify existing header binding definitions.

Aspects of this disclosure may also be used to bind identifiers for metadata. Metadata may include data stored in an SDN switch. Metadata may describe an object in an SDN network. For example, metadata may be describe a packet or sequence of packets, a destination, a source, or a traffic flow in a software defined network In some embodiments, metadata is excluded from the packet payload (or from the packet altogether). For example, metadata may be communicated via messages. The location and size of the metadata element may be specified along with an associated identifier binding.

FIG. 3 illustrates an embodiment method 300 for dynamically binding header field identifiers to header field types, as might be performed by an SDN controller. As shown, the method 300 begins with step 310, where the SDN controller sends a binding request to an SDN switch. The binding request may explicitly identify the proposed header binding definition, or may implicitly identify the proposed header binding definition by referencing a data path model (e.g., a negotiable data-path model (NDM)) that contains information for the proposed header binding definition. Thereafter, the method 300 proceeds to step 320, where the SDN controller determines whether a binding response is received before a timeout period expires. If a binding response is received before a timeout period expires, then the method 300 proceeds to step 330, where the SDN controller adopts a dynamic header field identifier to a header field. The header field identifier may have been an original header field identifier proposed by the binding request, or may be an alternate header field identifier indicated in the binding response, and may be dynamically bound to the header field type by writing an appropriate entry to a table stored by the SDN controller. If a binding response is not received before a timeout period expires, then the method 300 proceeds to step 340, where the SDN controller determines that default bindings will be used for data plane processing at the SDN switch.

Figure 4:
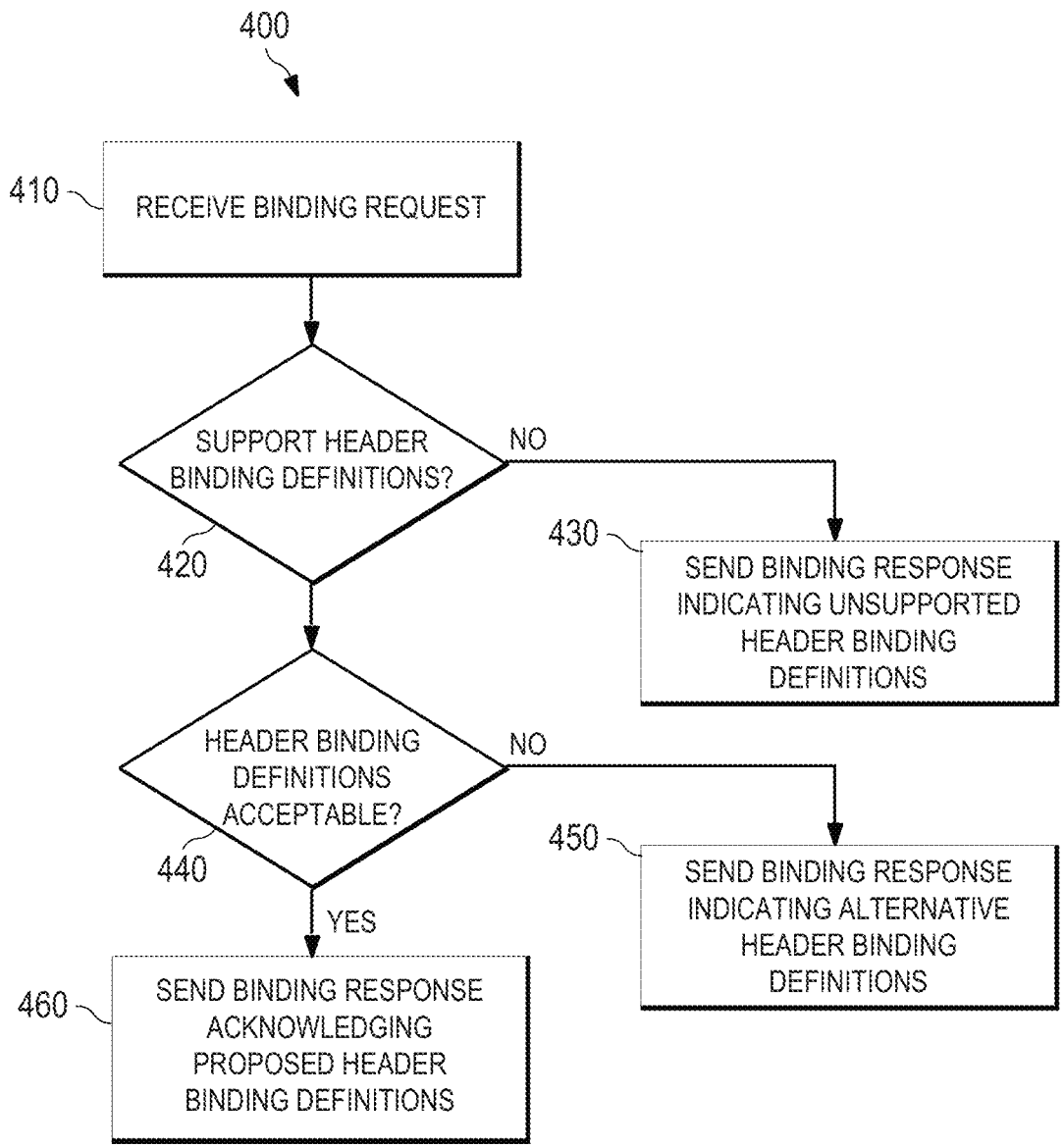
FIG. 4 illustrates a flowchart of another embodiment method for dynamically binding header field identifiers to header field types.

FIG. 4 illustrates an embodiment method 400 for dynamically binding header field identifiers to header field types, as might be performed by an SDN switch. As shown, the method 400 begins with step 410, where the SDN switch receives a binding request from an SDN controller. The binding request identifies a proposed header binding definition. Thereafter, the method 400 proceeds to step 420, where the SDN switch determines whether it is capable of supporting the proposed header binding definition. If not, the method 400 proceeds to step 430, where the SDN switch sends a binding response indicating that the header definition is not supported. If the SDN switch is capable of supporting the proposed header binding definition, then the method 400 proceeds to step 440, where the SDN switch determines whether the proposed header binding definition is acceptable. If not, the method 400 proceeds to step 450, where the SDN switch sends a binding response indicating an alternative header definition. If the proposed header binding definition is acceptable, then the method 400 proceeds to step 460, where the SDN switch sends a binding response acknowledging the proposed header binding definition. In this disclosure, the terms "header field definition" and "header binding definition" are used interchangeably and should be interpreted as including, inter alia, header field ID bindings and header type IDs unless otherwise indicated.

Figure 5:
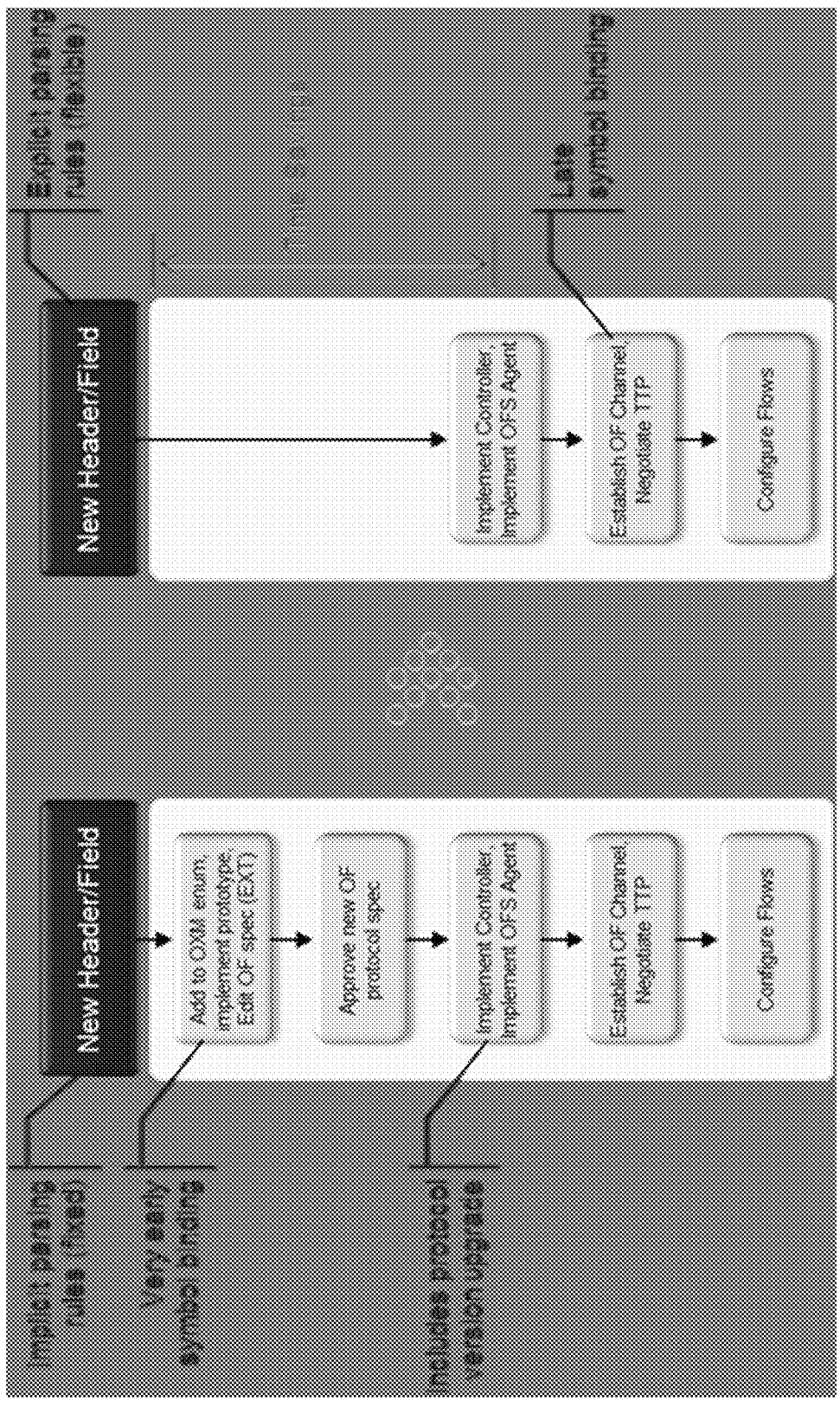
FIG. 5 illustrates a chart demonstrating the advantages of embodiment techniques for dynamically binding header field identifiers to header field types.

Dynamically binding header field identifiers allow for proprietary header field types to be implemented in SDN networks without having to update the standard. FIG. 5 illustrates a chart showing how embodiment techniques for dynamically binding header field identifiers save time save when compared to the conventional approach of updating communication protocol standards to reflect new header field bindings.

Embodiment techniques for dynamically binding header field identifiers may be performed, for example, when a controller and switch establish a relationship. This enables the addition of support for new information (e.g., header fields) without requiring any change to the network control protocol specification. Aspects of this disclosure provide an alternative to binding network information identifiers in the control protocol specification, for example as in enum oxm_ofb_match_fields in OpenFlow 1.3. For example, embodiment methods may define network information in generic terms as well as bind these definitions to control protocol identifier values either at the time a Negotiated Dataplane Model (NDM) specification is written or at the time a control relationship is established between a controller and a switch. An NDM is a specification of the forwarding behaviors required of a switch in a particular network application. These behaviors may be defined in general terms or in terms of a network control protocol (e.g., OpenFlow) and provide a shared understanding between a controller implementer and a switch implementer.

The following is an example of an embodiment NDM encoding of header type ID bindings and header field ID bindings:

```
"HeaderTypes" : [
    {"Header"      : "Ethernet",  // Name is not required, but
                                    included for clarity
     "TypeID"      : [0,0,"Ethernet"] // Base delineation type
     "oxm_class"   : 3
     "HeaderFields" : [
         {"Field"     : "MAC_DA",
          "Location"  : [0,48],
          "oxm_field" : 1
         },
         {"Field"     : "MAC_SA",
          "Location"  : [48,48],
          "oxm_field" : 2
         },
         {"Field"     : "EtherType",
          "Location"  : [96,16],
          "oxm_field" : 3
         }
     ]
    },
    {"Header"      : "C-TAG",
     "TypeID"      : [3,3,0x8100] // [Ethernet, EtherType, TPID]
     "oxm_class"   : 4
     "HeaderFields" : [
         {"Field"     : "VID",
          "Location"  : [4,12], // Assuming most significant byte
                                  first, most significant bit first
          "oxm_field" : 1
         },
         {"Field"     :"PCP",
          "Location"  : [0,3],
          "oxm_field" : 2
         },
         {"Field"     : "DEI",
          "Location"  : [3,1],
          "oxm_field" : 3
         }
    },
    {"Header"      : "IPv4",
     "TypeID"      : [3,3,0x0800] // [Ethernet, EtherType, IPv4]
     "oxm_class"   : 5
     "HeaderFields" : [ // Not all fields in the IP header are
                          included below
         {"Field"     : "Version",
          "Location"  : [0,4],
          "oxm_field" : 1
         },
         {"Field"     : "IHL",
          "Location"  : [4,4],
          "oxm_field" : 2
         },
         {"Field"     : "DSCP",
          "Location"  : [8,6],
          "oxm_field" : 3
         },
         {"Field"     :"ECN",
          "Location"  : [14,2],
          "oxm_field" : 4
         },
         {"Field"     : "Length",
          "Location"  : [16,16],
          "oxm_field" : 5
         },
         {"Field"     : "TTL",
          "Location"  : [64,8],
          "oxm_field" : 6
         },
         {"Field"     : "Protocol",
          "Location"  : [72,8],
          "oxm_field" : 7
         },
         {"Field"     : "IP_DA",
          "Location"  : [96,32],
          "oxm_field" : 8
         },
         {"Field"     : "IP_SA",
          "Location"  : [128,32],
          "oxm_field" : 9
         }
    }
]
```

In packet networks, the information governing packet forwarding behavior is encoded in a packet header. The packet header may include several fields containing different information related to the packet. In general these fields can be described by an offset (in bits) from the beginning of the header and a field size (in bits). Multiple packet headers may be appended to a packet as it traverses a network, for example a packet may have TCP, IP, and Ethernet MAC headers appended. Packet parsing (e.g., recognizing header fields) may be a repeated process involving parsing a first header, identifying a next header, parsing the next header, identifying a next header, etc.

Headers may appear in a variety of orders in a packet, and the same header type may appear multiple times. The beginning of a header may occur in an arbitrary location in a packet. Therefore, a header field can be described as belonging to a particular header type, being located at a certain offset from the beginning of the header, and being a certain size.

To parse a header, the header type may need to be known. The header type may be known based on the port on which the packet is received, the contents of the previous header, or the contents of the header itself. For example, a packet received on an 802.3 port may be assumed to contain an Ethernet MAC header, the EtherType field in that header may identify the next header as IP, and the first nibble of the IP header may identify it as an IPv4 header type. The rules for determining the packet header types to be parsed may be defined for an NDM to establish a common understanding of the encoding and semantics of packets to be handled by a switch and is the basis for the controller's decisions about what forwarding behavior controls to configure in the switch.

However, identifying header fields in a control protocol using a generic description may be less compact and/or involve increased parsing complexity when compared to customized header definitions. Customized header definitions and/or header parsing rules may use two values, namely a header type identifier value and a header field identifier value. For example the OpenFlow extensible match (OXM) TLV in the OpenFlow protocol encodes field identifiers using two fields: a 16-bit oxm_class value and a 7-bit oxm_field value. In this case the oxm_field values are defined in the OpenFlow protocol specification in the enum oxm_ofb_match_fields data type.

Aspects of this disclosure provide a protocol to determine or select header field identifier value bindings. This may eliminate the need for the header field identifier values to be specified statically in the control protocol.

Header fields are identified in the context of a header type. The header type is identified as a delineation base header type associated with a packet delineation mechanism (e.g., Ethernet, GFP, PPP/HDLC, etc.) or as a header type identified by a standard protocol identification scheme (e.g., EtherType, GFP Payload Type Indicator, PPP Protocol Number, etc.). For each header type required in a particular control application, the header type is specified along with the relevant header fields. The controller and switch exchange the following information for each header type: Header type identification method; Header type; header fields; and header length;

The header type identification method may specify the type of method used to identify a header, such as a delineation base type, a previously assigned local header type identifier value, etc. The header type may specify a Standard protocol identifier (e.g., a delineation base type, a previously assigned local header field identifier and value, etc.) or an assigned local header type identifier value (e.g., for control protocol instances). Each header fields may specify an offset and size, e.g., (offset, size), as well as an assigned local header field identifier value (e.g., for control protocol instances). The header length may specify a scalar value (e.g., for a fixed size header) or a header field identifier value (e.g., for variable length headers containing a length field).

For convenience, fixed values may be assigned to common header type identification fields, for example to EtherType, GFP Payload Type Indicator, and PPP Protocol Number. These commonly used fields provide a basis for identifying most other useful protocol header types. Offset can be expressed as a fixed value or as an arithmetic expression involving fixed values and header fields.

Embodiment protocols may exchange the information described above between a controller and a switch to agree on the values to be used to identify specific packet header fields. The identifiers to be agreed upon are the assigned local header type identifier value and assigned local header field identifier value. Either system may propose the values to be used, depending on whether that system has a preference or particular requirements for these identifiers. If the assigned local header type identifier value and assigned local header field identifier value are sent as zero (or some other selected special value, e.g. −1) this is an invitation for the other system to assign the identifier values. If the switch sends identifier value bindings, the controller must adopt these values. If the switch sends zero values, the controller must assign values and transmit these to the switch.

The controller may first send the information without specifying identifier values (using values of zero) to indicate to the switch all of the fields the controller will use in controlling the switch's behavior. The switch may respond with specific identifier values (bindings) or with unspecified bindings (values of zero). The controller then sends final bindings to the switch, repeating the values required by the switch or setting the values not specified by the switch.

Special procedures may be used to support backward compatibility with earlier fixed field identifier assignments. For example, the identifiers specified by OpenFlow 1.3 may be required by the switch by its sending the oxm_class value of 0x8000 and oxm_field values as defined in the enum oxm_ofb_match_fields data type to the controller for fields defined in that specification. This would require that the controller adopt these identifier values for the specified fields.

If the controller and switch use a Negotiated Dataplane Model (NDM), for example a Table Type Pattern (TTP), to agree on the behavioral controls the switch must support then equivalent information to that above may be included in the NDM. In this case the header field identifier value binding process may be abbreviated or skipped if the NDM includes the header type identifier values and header field identifier values to be used. For example, a TTP may include the header type identifier values and header field identifier values as a part of the TTP description. Alternatively, a TTP may include the header types and header fields and assume a canonical method for assigning identifier values for these so that the explicit values need not be included in the TTP but will be equally understood by both the controller and switch if they agree to use the TTP.

By exchanging the information cited above the controller and switch agree on the assigned local header type identifier value and assigned local header field identifier value. The controller can then send commands to the switch that reference header fields using the local header type identifier value and local header field identifier value. For example in OXM TLVs in OpenFlow messages the assigned local header type identifier value for a particular header type may be used as the oxm_class value and the assigned local header field identifier value may be used as the oxm_field value. The local header field identification values may be used to refer to header fields in match operations or in other logic or arithmetic expressions used by the controller to specify switch behavior via the control protocol. They may also be used in messages from the switch to identify header fields in notifications or responses to the controller.

Aspects of this disclosure provide a Protocol exchange to agree on local header field identifier values based on either header type identification and field offset/size specification or an NDM specification (containing equivalent information). Embodiments of this disclosure generate and interpret header field identifier values based on local agreement. Additionally, this disclosure supports backward compatibility by allowing the switch to force pre-defined bindings. Embodiments discussed herein may include the header field identifier value bindings in an NDM, e.g., a TTP.

Figure 6:
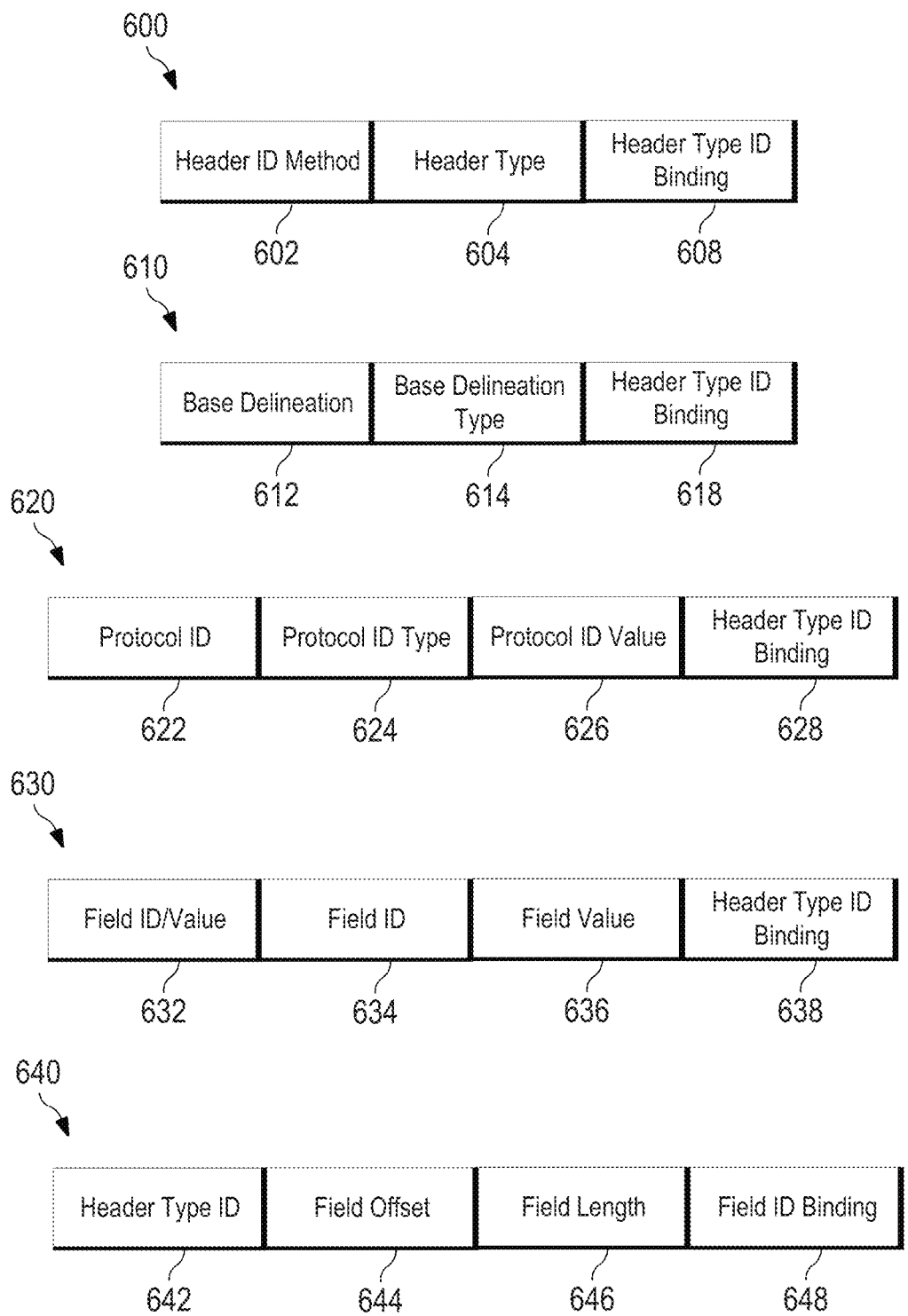
FIG. 6 illustrates a diagram of embodiment header field/type ID binding information formats.

In embodiments, a binding request response may include header type ID binding information and header field ID binding information. The header type ID binding information may specify a means of header type identification, as well as one or more values identifying the header type and a header type ID binding (e.g., a local code point) used to identify the header type. In an embodiment, the header type ID binding information may specify a base delineation type as the means for header type identification. The base delineation type may be a binding for a packet delineation header scheme, e.g., Ethernet, GFP, HDLG, ATM HEC framing, etc. In another embodiment, the header type ID binding information may specify a protocol ID as the means for header type identification. The protocol ID may be a binding for a protocol ID scheme (e.g., EtherType, IP Protocol, NLPID, etc.). In yet another embodiment, the header type ID binding information may specify a field ID and a field value (e.g., "field ID"+"field value") as the means for header type identification. The header field ID and the field value may correspond to previously bound field ID code points and field values, and may allow the header definition to use local field ID binding (rather than a public binding) for a protocol ID field. The header field ID binding information may include a header type, a field offset (in bits), a field length (in bits), and a field ID binding. The field ID binding may be a local code point used to identify the corresponding header field FIG. 6 illustrates a diagram of embodiment header type ID binding information formats 600, 610, 620, 630, and an embodiment header field ID binding information format 640. The header type ID binding information format 600 may represent a generic structure, and the header type ID binding information formats 610, 620, 630 may represent examples of sub-classes of the generic structure represented by the header type ID binding information format 600. As shown, the header type ID binding information format 600 includes a header ID method field 602, a header type field 604, and a header type ID binding field 608. The header type ID binding information format 610 includes a base delineation field 612, a base delineation type field 614, and a header type ID binding field 618. The header type ID binding information format 620 includes a protocol ID field 622, a protocol ID type field 624, a protocol ID value field 626, and a header type ID binding field 628. The header type ID binding information format 630 includes a field ID/value 632, a field ID 634, a field value 636, and a header type ID binding 638. The header ID method field 602 may be a generic header field. The base delineation field 612, the protocol ID field 622, and the field ID/value 632 may be examples of sub-classes of the generic header field represented by the header ID method field 602. The header type field 604 may be a generic header field. The base delineation type field 614, the protocol ID type and value fields 624/626, and field ID and value fields 634/636 may be examples of sub-classes of the generic header field represented by the header type field 604. The header type ID binding fields 608, 618, 628, and 638 may substantially similar to one another.

The embodiment header field ID binding information 640 includes a header type ID field 642, a field offset 644, a field length 646, and a field ID binding 648. The header type ID field 642 is a value bound in an instance of the header type ID binding information formats 600 (e.g., one of the header type ID binding fields 608, 618, 628, and 638). The field offset 644, the field length 646, and the field ID binding 648 include information for locating the header field in a message.

Figure 7:
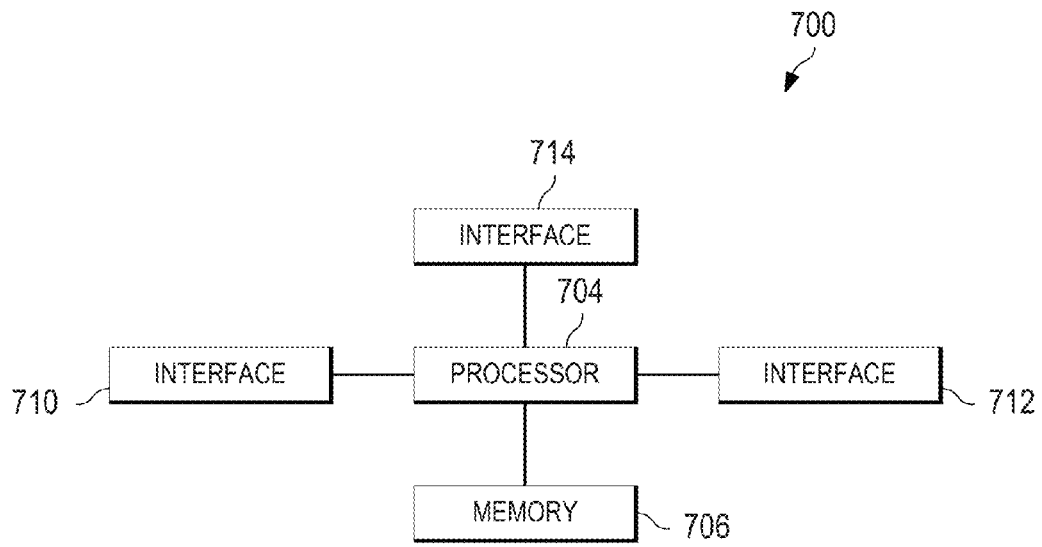
FIG. 7 illustrates a diagram of an embodiment communications device.

FIG. 7 illustrates a block diagram of an embodiment device 700, which may be equivalent to one or more devices (e.g., SDN controller, SDN switch, etc.) discussed above. The communications device 700 may include a processor 704, a memory 706, and a plurality of interfaces 710-714, which may (or may not) be arranged as shown in FIG. 7. The processor 704 may be any component capable of performing computations and/or other processing related tasks, and the memory 706 may be any component capable of storing programming and/or instructions for the processor 704. The interfaces 710-714 may be any component or collection of components that allow the communications device 700 to communicate with other devices, an SDN controller, SDN switches, a user interface, etc.

Figure 8:
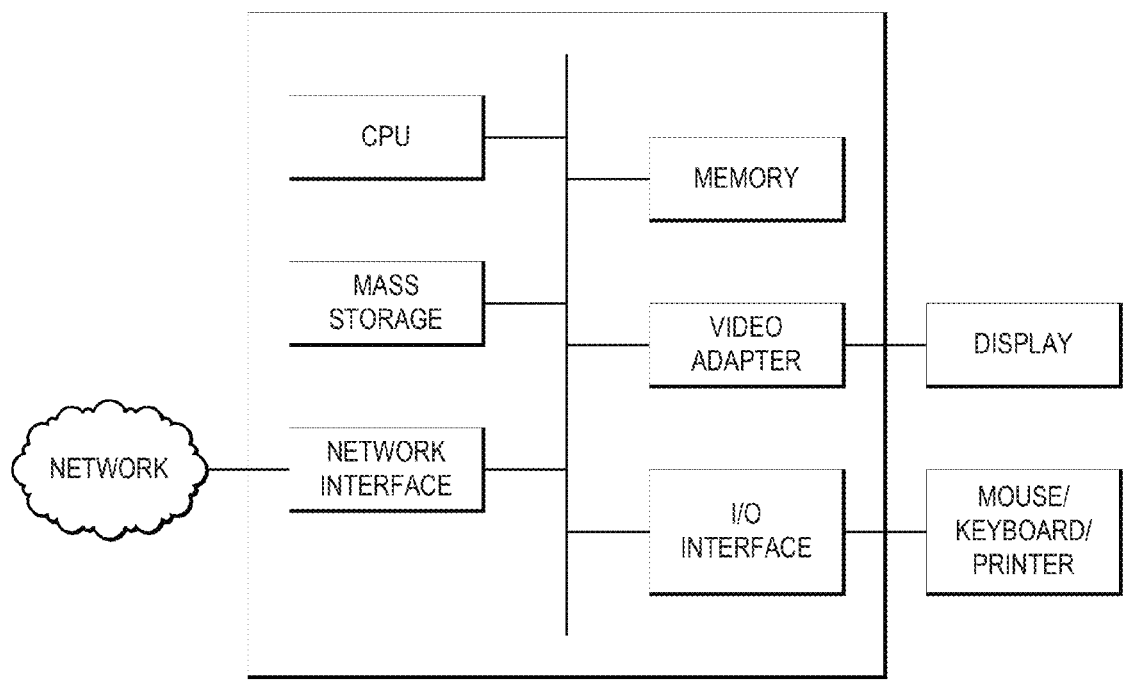
FIG. 8 illustrates a diagram of an embodiment computing platform.

FIG. 8 is a block diagram of a processing system that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description.

It is therefore intended that the appended claims encompass any such modifications or embodiments.

What is claimed is:

1. A method for dynamically binding header field identifiers, the method comprising:
sending, by a software defined network (SDN) controller, a binding request to an SDN switch of an SDN domain, the binding request requesting establishment of a dynamic header definition that dynamically associates a header field with a first header field identifier, wherein the binding request includes a code point binding indication requesting that a unique header field be dynamically associated with a first OpenFlow extensible match (OXM) field of a first OXM class, and wherein the unique header field is excluded from header fields associated with the default set of match fields specified in section 7.2.3.7 of the OpenFlow Switch Specification, version 1.3.3, Protocol version 0x04; and
determining, by the SDN controller, whether the SDN switch acknowledges establishment of the dynamic header definition, wherein the first header field identifier is configured to identify the header field in messages communicated to the SDN switch when the SDN switch acknowledges establishment of the dynamic header definition.

2. The method of claim 1, further comprising:
updating a table in the SDN controller to associate the header field with the first header field identifier when the SDN switch acknowledges establishment of the dynamic header definition.

3. The method of claim 1, further comprising:
receiving, by the SDN controller, a binding response from the SDN switch, wherein the binding response includes an alternative header binding association that dynamically associates the header field with a second header field identifier that is different than the first header field identifier; and
updating a table in the SDN controller to associate the header field with the second header field identifier.

4. The method of claim 1, wherein determining whether the SDN switch acknowledges the binding request comprises:
determining that the SDN switch has declined establishment of the dynamic header definition when a binding response is not received from the SDN switch within a threshold period from sending the binding request.

5. The method of claim 1, further comprising:
determining that the SDN switch recognizes a set of default header definitions when a binding response is not received from the SDN switch within a threshold period from sending the binding request.

6. A method for dynamically binding header field identifiers, the method comprising:
sending, by a software defined network (SDN) controller, a binding request to an SDN switch of an SDN domain, the binding request requesting establishment of a dynamic header definition that dynamically associates a header field with a first header field identifier, wherein the dynamic header definition is a code point binding indication that associates the header field with a first OpenFlow extensible match (OXM) field of a first OXM class, the header field not having been associated with the first OXM field of the first OXM class by the SDN switch prior to establishment of the dynamic header definition; and
determining, by the SDN controller, whether the SDN switch acknowledges establishment of the dynamic header definition, wherein the first header field identifier is configured to identify the header field in messages communicated to the SDN switch when the SDN switch acknowledges establishment of the dynamic header definition.

7. The method of claim 6, wherein determining whether the SDN switch acknowledges the dynamic header definition comprises:
determining that the SDN switch acknowledged establishment of the code point binding indication.

8. The method of claim 7, wherein the SDN switch is configured to determine that the header field is associated with a message when the first OXM field and the first OXM class are carried in an OXM type-length-value (TLV) of the message.

9. The method of claim 8, wherein the binding request identifies the dynamic header definition by referencing a negotiable data-path model, the negotiable data-path model being a priori information describing a class of forwarding behaviors.

10. A software defined network (SDN) controller comprising:
a processor; and
a non-transitory computer readable storage medium storing programming for execution by the processor, the programming including instructions to:
send a binding request to an SDN switch of an SDN domain, the binding request requesting establishment of a dynamic header definition that dynamically associates a header field with a first header field identifier, wherein the binding request includes a code point binding indication requesting that a unique header field be dynamically associated with a first OpenFlow extensible match (OXM) field of a first OXM class, and wherein the unique header is excluded from header fields associated with the default set of match fields specified in section 7.2.3.7 of the OpenFlow Switch Specification, version 1.3.3, Protocol version 0x04; and
determine whether the SDN switch acknowledges establishment of the dynamic header definition, wherein the first header field identifier is configured to identify the header field in messages communicated to the SDN switch when the SDN switch acknowledges establishment of the dynamic header definition.

11. The SDN controller of claim 10, wherein the programming further includes instructions to:
receive a binding response from the SDN switch, wherein the binding response includes an alternative header definition that dynamically associates the header field with a second header field identifier that is different than the first header field identifier; and
update a table in the SDN controller to associate the header field with the second header field identifier.

12. The SDN controller of claim 10, wherein the instructions to determine whether the SDN switch acknowledges the binding request includes instructions to:
determining that the SDN switch recognizes a set of default header definitions when a binding response is not received from the SDN switch within a threshold period from sending the binding request.

13. A software defined network (SDN) controller comprising:
a processor; and a non-transitory computer readable storage medium storing programming for execution by the processor, the programming including instructions to:
send a binding request to an SDN switch of an SDN domain, the binding request requesting establishment of a dynamic header definition that dynamically associates a header field with a first header field identifier, wherein the dynamic header definition is a code point binding indication that associates the header field with a first OpenFlow extensible match (OXM) field of a first OXM class, the header field not having been associated with the first OXM field of the first OXM class by the SDN switch prior to establishment of the dynamic header definition; and
determine whether the SDN switch acknowledges establishment of the dynamic header definition, wherein the first header field identifier is configured to identify the header field in messages communicated to the SDN switch when the SDN switch acknowledges establishment of the dynamic header definition.

14. A method for dynamically binding header field identifiers, the method comprising:
receiving, by a software defined network (SDN) switch, a binding request from an SDN controller, the binding request requesting establishment of a dynamic header definition that dynamically associates a header field with a first header field identifier, wherein the binding request includes a code point binding indication requesting that a unique header field be dynamically associated with a first OpenFlow extensible match (OXM) field of a first OXM class, and wherein the unique header field is excluded from header fields associated with the default set of match fields specified in section 7.2.3.7 of the OpenFlow Switch Specification, version 1.3.3, Protocol version 0x04;
sending, by the SDN switch, a binding response to the SDN controller, wherein the binding request either acknowledges or declines establishment of the dynamic header definition; and
using the first header field identifier to identify the header field in messages received by the SDN switch when the binding response acknowledges establishment of the dynamic header definition.

15. The method of claim 14, wherein the binding response indicates establishment of an alternative header definition that dynamically associates the header field with a second header field identifier, the second header field identifier being different than the first header field identifier.

16. The method of claim 14, wherein the binding response indicates that default header definitions are understood by the SDN switch.

17. A software defined network (SDN) switch comprising:
a processor; and
a non-transitory computer readable storage medium storing programming for execution by the processor, the programming including instructions to:
receive a binding request from an SDN controller, the binding request requesting establishment of a dynamic header definition that dynamically associates a header field with a first header field identifier, wherein the binding request includes a code point binding indication requesting that a unique header field be dynamically associated with a first OpenFlow extensible match (OXM) field of a first OXM class, and wherein the unique header is excluded from header fields associated with the default set of match fields specified in section 7.2.3.7 of the OpenFlow Switch Specification, version 1.3.3, Protocol version 0x04;
send a binding response to the SDN controller, wherein the binding request either acknowledges or declines establishment of the dynamic header definition; and
use the first header field identifier to identify the header field in messages received by the SDN switch when the binding response acknowledges establishment of the dynamic header definition.

18. The SDN switch of claim 17, wherein the binding response indicates establishment of an alternative header definition that dynamically associates the header field with a second header field identifier, the second header field identifier being different than the first header field identifier.

19. The SDN switch of claim 17, wherein the binding response indicates that default header definitions are understood by the SDN switch.

* * * * *